United States Patent
Uechi (10) Patent No.: US 7,859,652 B2
(45) Date of Patent: Dec. 28, 2010

(54) SIGHT-LINE END ESTIMATION DEVICE AND DRIVING ASSIST DEVICE

(75) Inventor: Masaaki Uechi, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 12/309,731

(22) PCT Filed: Sep. 13, 2007

(86) PCT No.: PCT/IB2007/003548

§ 371 (c)(1),
(2), (4) Date: Jan. 28, 2009

(87) PCT Pub. No.: WO2008/032220

PCT Pub. Date: Mar. 20, 2008

(65) Prior Publication Data

US 2009/0237644 A1    Sep. 24, 2009

(30) Foreign Application Priority Data

Sep. 14, 2006  (JP) .............................. 2006-249732

(51) Int. Cl.
*G01P 3/36* (2006.01)
(52) U.S. Cl. .................... 356/29; 356/5.01; 356/5.1; 356/5.15
(58) Field of Classification Search ....... 356/3.01–28.5, 356/5, 356/29
See application file for complete search history.

(56) References Cited

FOREIGN PATENT DOCUMENTS

| EP | 1 484 014 A1 | 12/2004 |
|---|---|---|
| EP | 1484014 | * 12/2004 |
| JP | A-06-189906 | 7/1994 |
| JP | A-7-55941 | 3/1995 |
| JP | A-2002-083400 | 3/2002 |
| JP | A-2004-009833 | 1/2004 |
| JP | A-2005-134971 | 5/2005 |
| JP | A-2005-284797 | 10/2005 |
| JP | A-2005-284798 | 10/2005 |
| JP | A-2005-284975 | 10/2005 |
| JP | A-2005-293479 | 10/2005 |
| JP | A-2006-163828 | 6/2006 |

* cited by examiner

*Primary Examiner*—Thomas H Tarcza
*Assistant Examiner*—Luke D Ratcliffe
(74) *Attorney, Agent, or Firm*—Oliff & Berridge, PLC (57) ABSTRACT

A sight-line end estimation device includes a sight-line direction detection portion that detects a sight-line direction of a driver of a vehicle, a target object detection portion that detects the positions of target objects existing around the vehicle, a relative position acquisition portion that acquires relative positional information between the driver and the target object detection portion, and a sight-line end estimation portion that estimates the driver's sight-line end by detecting a target object whose position detected by the target object detection portion lies substantially in the driver's sight-line direction detected by the sight-line direction detection portion, factoring in the relative positional information acquired by the relative position acquisition portion.

7 Claims, 10 Drawing Sheets

SIGHT-LINE END ESTIMATION DEVICE AND DRIVING ASSIST DEVICE

BACKGROUND OF THE INVENTION

1. Field of the Invention

The invention relates to a sight-line end estimation device that estimates a driver's sight-line end.

2. Description of the Related Art

Sight-line end estimation devices that estimate at what object a driver is directing his/her sight line in order to assist the driver have been developed. A sight-line end estimation device of a vehicle, for example, detects the driver's sight-line direction, and detects the relative direction of each of the target objects (vehicles, persons, etc.) that exist around the host vehicle relative to the host vehicle, and determines at which one of the target objects the driver is directing his/her sight line by comparing the direction of the sight-line with each of the relative directions of the target objects, and determines whether the driver is aware of a risk or danger (see (Japanese Patent Application Publication No. 2005-134971 (JP-A-2005-134971)).

Figure 10:
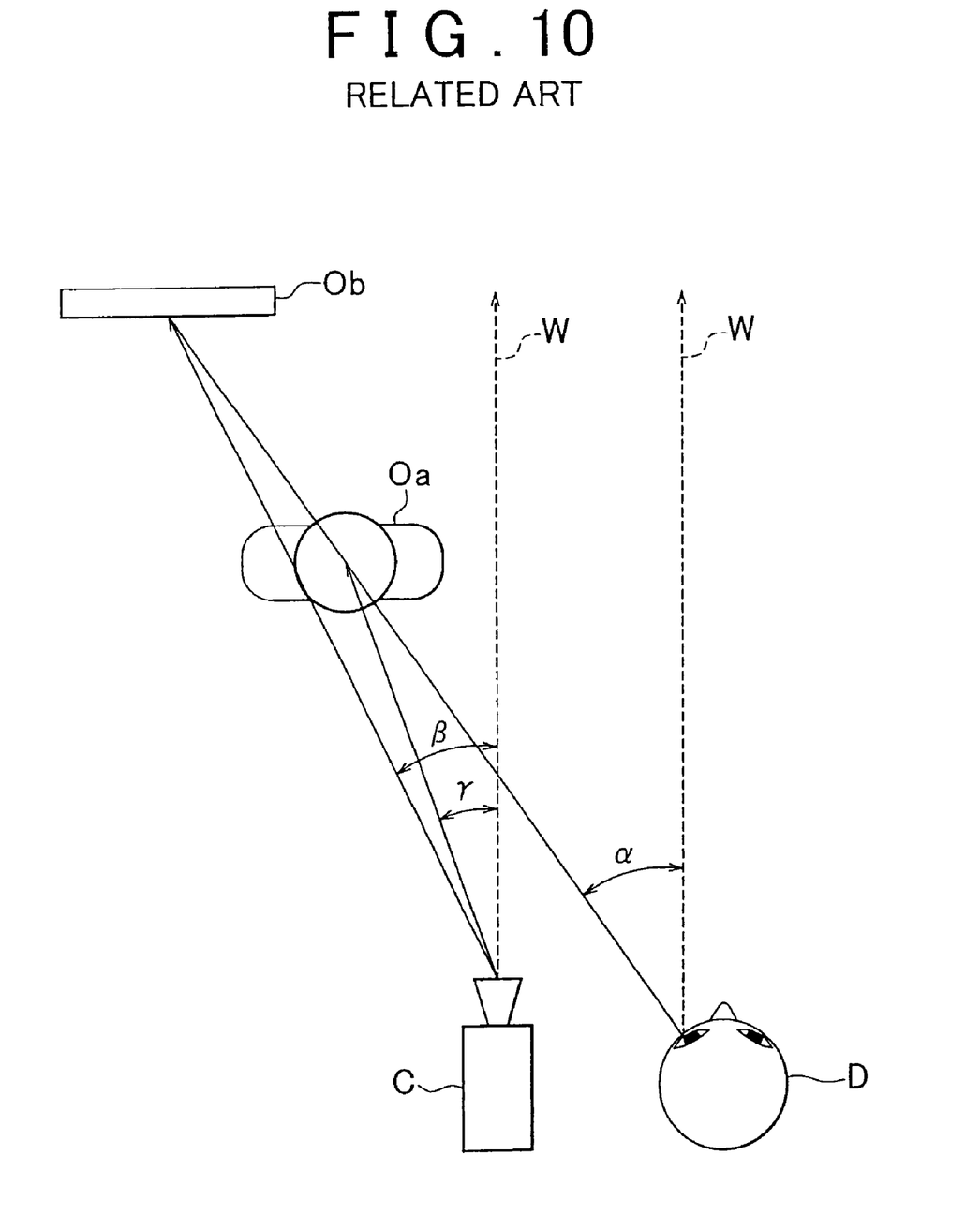
FIG. 10 shows an example of a positional relationship among a driver, a sight field video picture camera and objects.

In the above-described sight-line end estimation device, the position of the driver's eyes and the position of the detection means that has detected the relative directions of the target objects are different from each other, so that simple comparison between the sight-line direction and the relative directions cannot provide accurate estimation of a target object at which the driver is actually directing his/her sight line. FIG. 10 shows an example of a relationship between the sight-line direction α of a driver D (the angle thereof with respect to the longitudinal direction of the vehicle) and the relative directions γ, β of target objects Oa, Ob detected from a sight field image provided by a sight field video picture camera C (the angles thereof with respect to the longitudinal direction of the vehicle). In this example, the target object Oa and the target object Ob both exist in the sight-line direction α of the driver D. However, since the position of the eyes of the driver D and the position of the sight field video picture camera C are different from each other, the relative direction γ of the target object Oa and the relative direction β of the target object Ob detected from the sight field image provided by the sight field video picture camera C are different from each other, and are also different from the sight-line direction α of the driver D. Therefore, when the sight-line direction α is compared with the relative directions γ, β, it may not be able to be determined that the driver is looking at the target object Oa.

SUMMARY OF THE INVENTION

Therefore, the invention provides a sight-line end estimation device that improves the accuracy in the estimation of the driver's sight-line end.

A sight-line end estimation device of an aspect of the invention includes: a sight-line direction detection portion that detects a sight-line direction of a driver of a vehicle; a target object detection portion that detects a position of a target object existing around the vehicle; a relative position acquisition portion that acquires relative positional information between the driver and the target object detection portion; and a sight-line end estimation portion that estimates a sight-line end of the driver by detecting a target object whose position detected by the target object detection portion lies substantially in the driver's sight-line direction detected by the sight-line direction detection portion, factoring in the relative positional information acquired by the relative position acquisition portion.

Thus, according to the sight-line end estimation device of the foregoing aspect of the invention, in the case where the position of the driver and the position of the target object detection portion are different from each other, relative positional relationship therebetween is factored in to estimate the driver's sight-line end, so that the driver's eye point and a detection reference point of the target object detection portion can be brought into coincidence for the estimation of the sight-line end. Therefore, the accuracy in estimating the sight-line end improves.

The relative positional information is information that indicates a relative relationship therebetween, for example, a relative direction, a relative distance, etc. The relative position acquisition portion may employ various means. For example, the relative position acquisition portion may directly detect the relative positional information through the use of a sensor or the like, or may also detect the position of the driver (the driver's head position or eye position, or the like) through the use of a sensor or the like, and detect the relative positional information from the detected position and the pre-known position of the target object detection portion, or may also calculate the relative positional information from the estimated position of the driver and the pre-known position of the target object detection portion, and store the relative positional information. The position of the driver for finding the relative positional information may be the driver's head position or the driver's eye position. When the sight-line end estimation portion factors in the relative positional information, the sight-line end estimation portion may search for a target object existing in the driver's sight-line direction from the objects detected with the relative positional information factored in, after both the sight-line direction detection portion and the target object detection portion have performed detection. Or, after one of the sight-line direction detection portion and the target object detection portion has performed detection, the information detected by the one of the detection portions may be corrected with the relative positional information, and the detection performed by the other one of the detection portions may be performed by using the corrected information.

The sight-line end estimation portion may correct at least one of the driver's sight-line direction information and the position information of the target object based on the relative positional information so that the position of the driver and the position of the target object detection portion coincide with each other, and, after the correction, may detect a target object whose position lies substantially in the driver's sight-line direction.

That is, using the corrected driver's sight-line direction and/or the corrected positional information of the object, a target object existing at the position that lies substantially in the sight-line direction is detected. By performing this correction, the driver's eye point and the detection reference point of the target object detection portion are brought into coincidence in order to perform the estimation of the sight-line end.

The sight-line end estimation device may further include an evaluation portion that evaluates a likelihood of the driver's sight line being presently directed in a direction of the target object. The sight-line end estimation portion may estimate the driver's sight-line end based on the target object at which it is highly likely that the driver's sight line is presently directed, using a result of evaluation provided by the evaluation portion. In particular, the evaluation portion may evaluate the likelihood of the driver's sight line being presently directed in the direction of the target object based on the target object whose position lies substantially in the driver's sight-line direction detected concurrently with the position of the target object, at a plurality of time points.

As for the evaluation method of the evaluation portion, the method of evaluating the likelihood of the driver's sight line being presently directed in the direction of a certain target object on the basis of the information regarding target objects each of which exists at a position that lies substantially in the driver's sight-line direction at any one of a plurality of time points is an easy and highly accurate method. For example, of the target objects detected as target objects existing at the positions that lie substantially in the driver's sight-line direction at any one of different time points, a target object common to all the different time points may be evaluated as being an object at which it is highly likely that the driver's sight line is presently directed. Then, in the case where there are a plurality of target objects whose positions lie substantially in the driver's sight-line direction, the sight-line end estimation portion may estimate a target object (sight-line end) at which the driver's sight line is presently directed from a plurality of target objects, on the basis of a target object at which it is highly likely that the driver's sight line is presently directed, through the use of a result of evaluation provided by the evaluation portion. Thus, even if there are a plurality of target objects existing at positions that lie substantially in the driver's sight-line direction, the target objects can be narrowed down to a target object at which the driver's sight line is presently directed, by evaluating, with regard to each of one or more of the target objects, the likelihood of the driver's sight line being presently directed in the direction of the target object. Therefore, the accuracy in estimating the sight-line end improves.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of a sight-line end estimation device in accordance with the invention will be described hereinafter with reference to the drawings.

In an embodiment of the invention, the sight-line end estimation device is applied to a vehicle driving assist device that is mounted in a vehicle. In order to inform the driver of the presence of an obstacle that the driver is not aware of, the driving assist device in accordance with this embodiment outputs a warning on the basis of the positional relationship between the driver's sight-line end and the obstacle.

Figure 1:
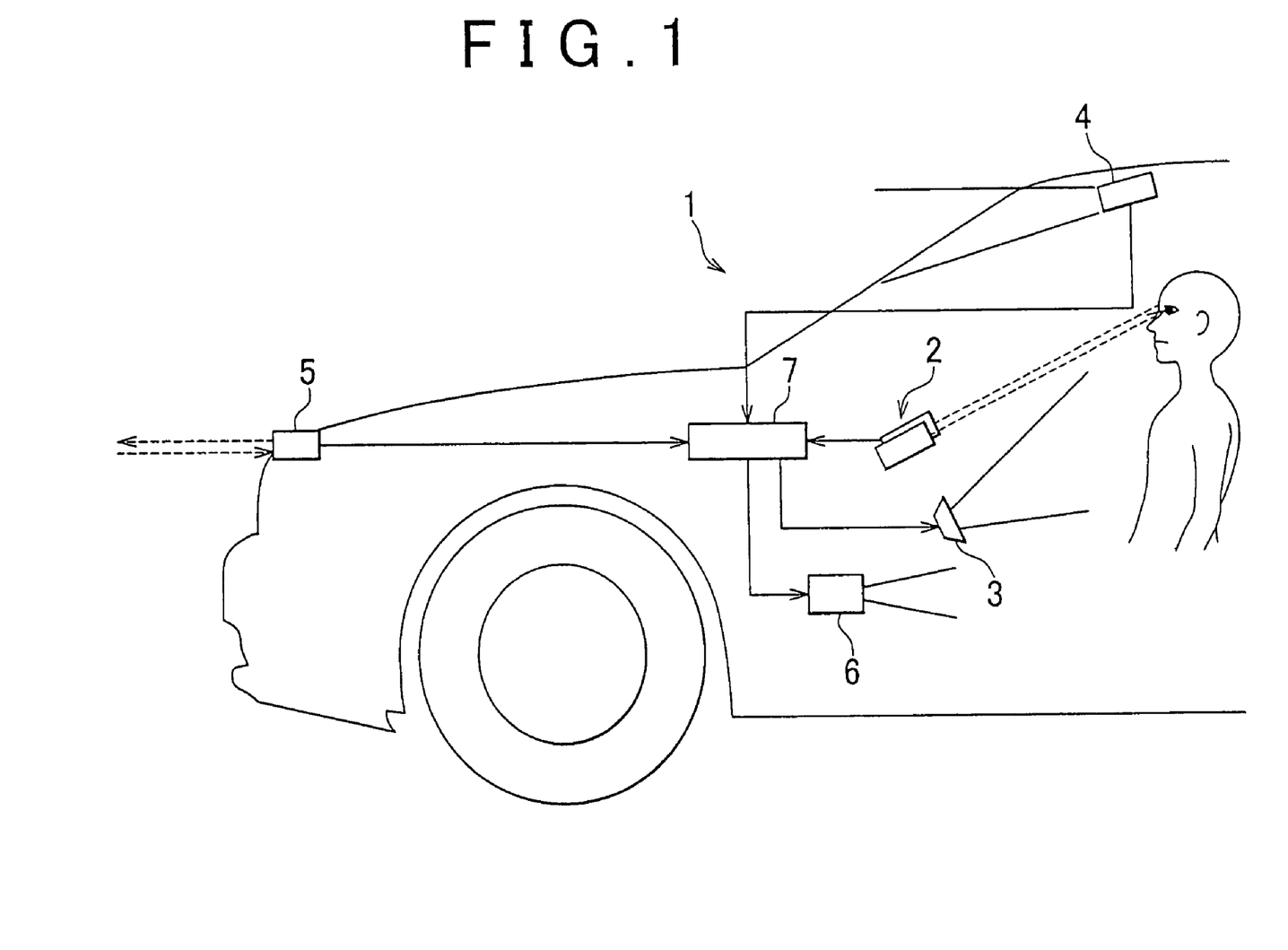
FIG. 1 is a construction diagram of a driving assist device in accordance with an embodiment of the invention.
Figure 2:
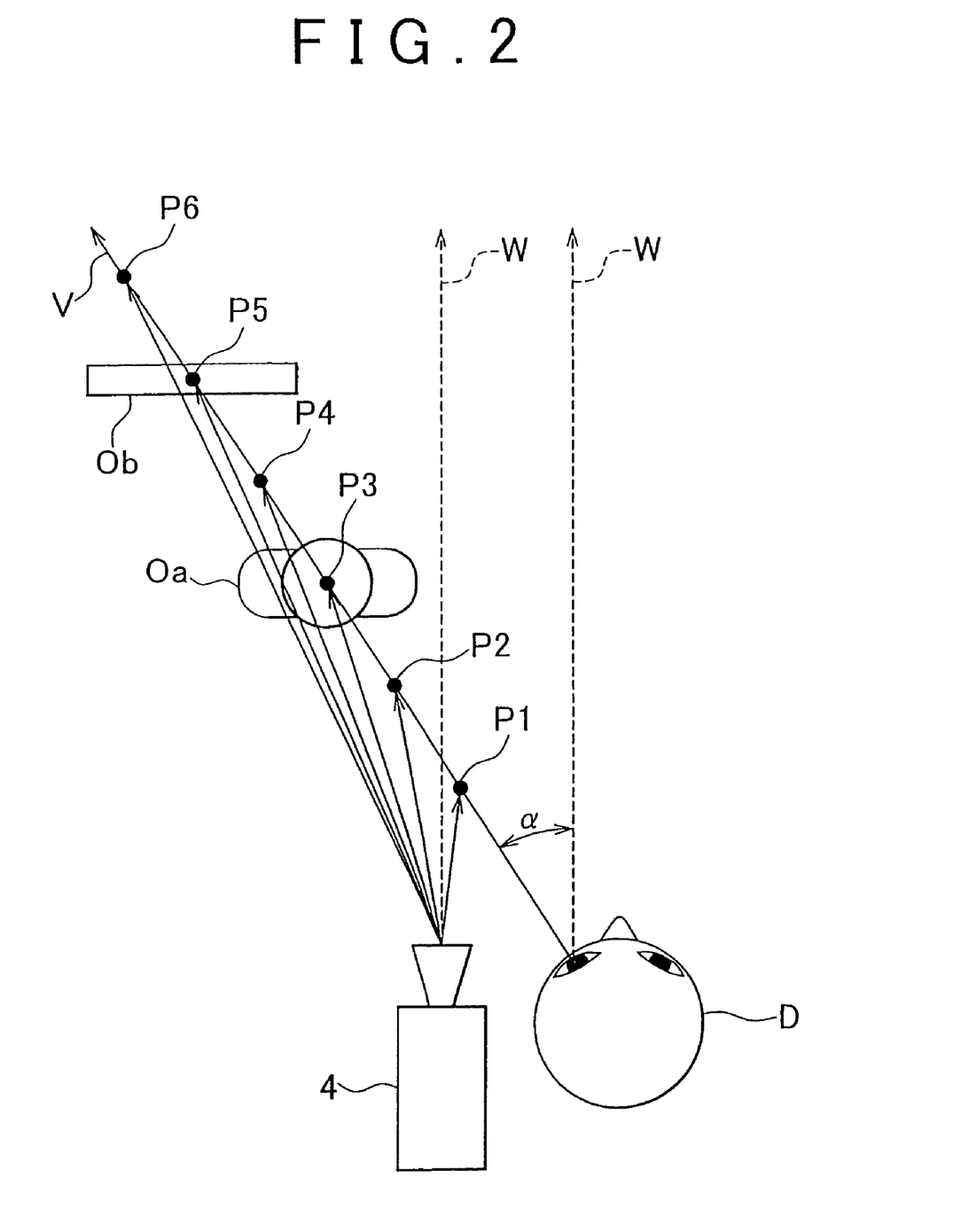
FIG. 2 shows an example of a positional relationship among a driver, a sight field video picture camera and objects in accordance with the embodiment.
Figure 3:
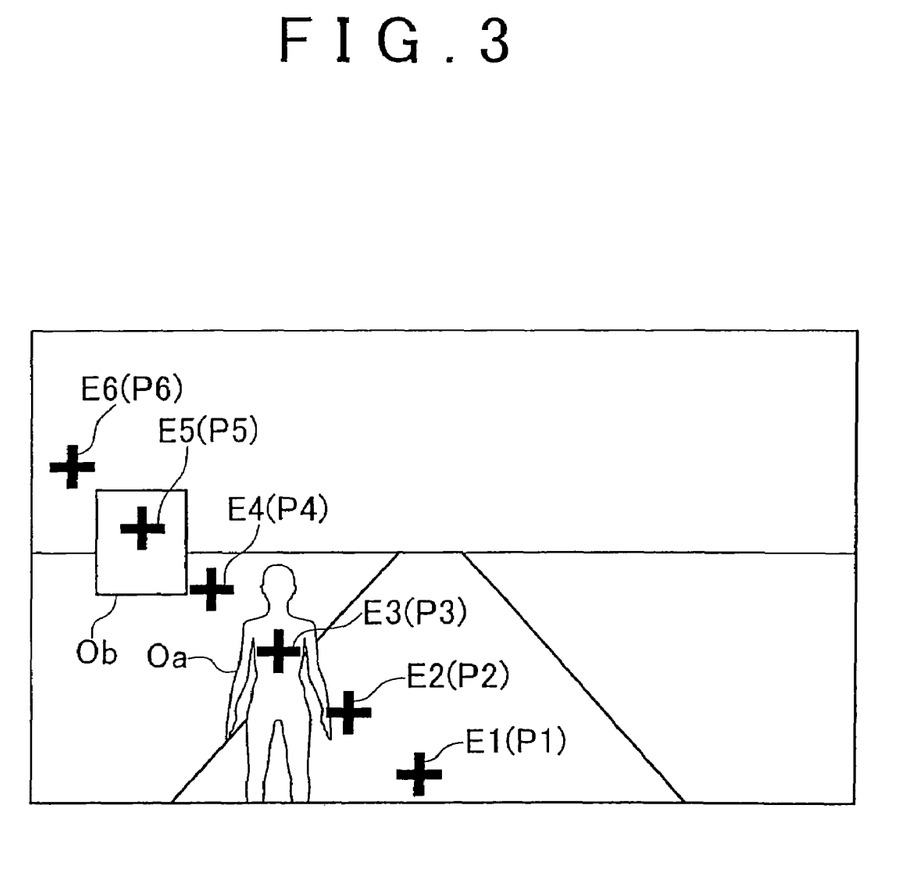
FIG. 3 shows an example of a sight field image provided by the sight field video picture camera which is superimposed with eye marks, in accordance with the embodiment.
Figure 4:
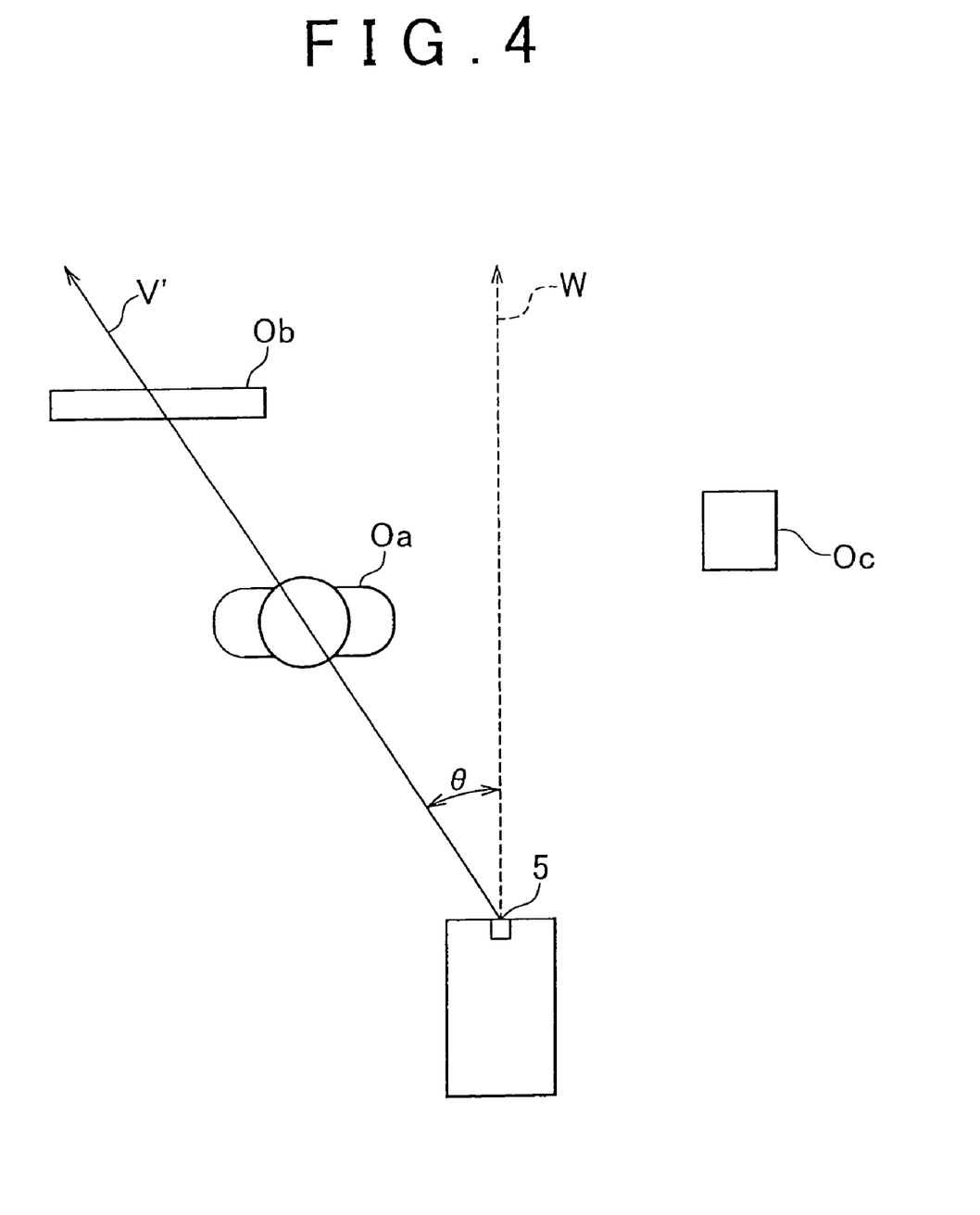
FIG. 4 shows an example of a positional relationship between a millimeter wave radar and an object in accordance with the embodiment.
Figure 5:
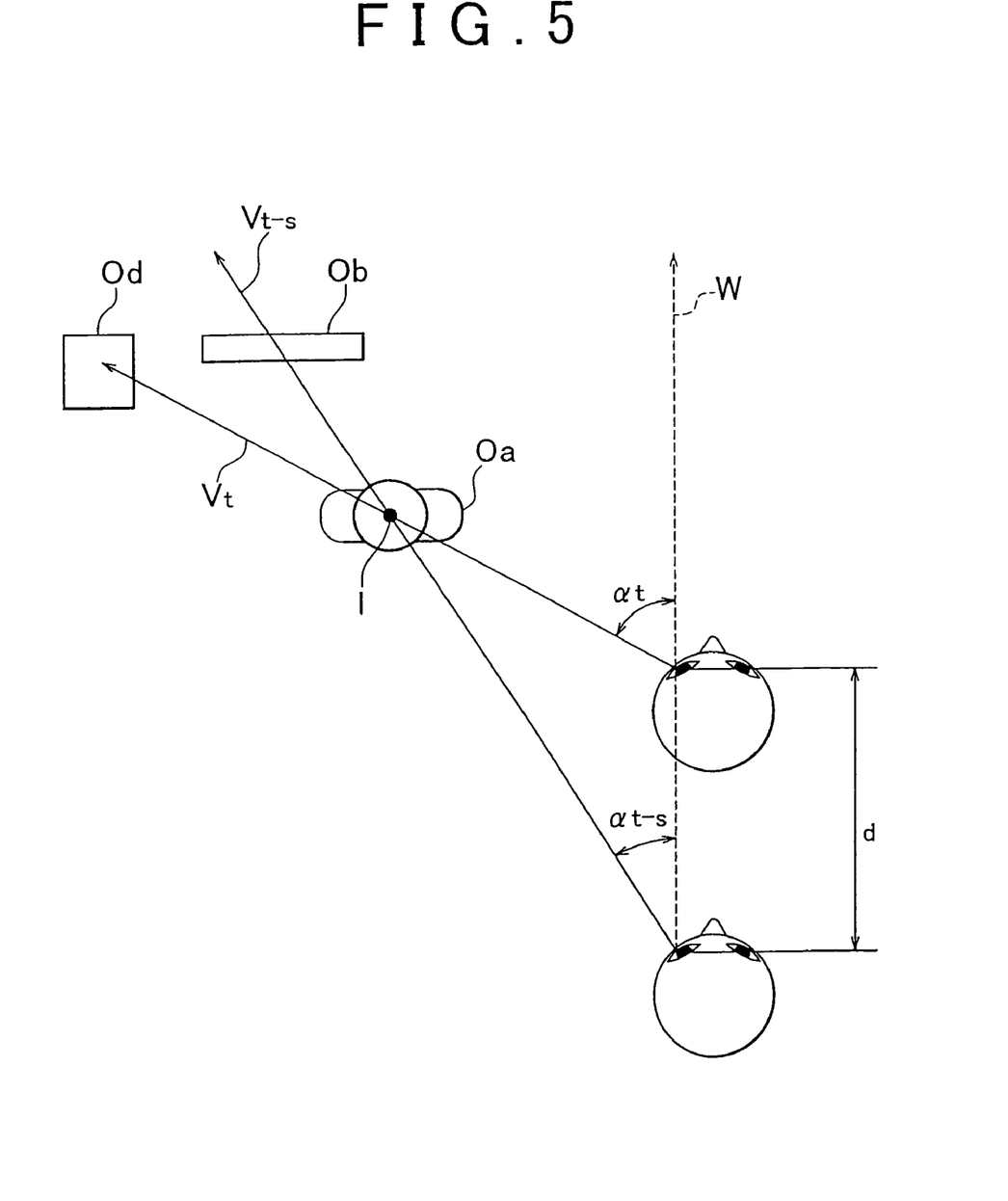
FIG. 5 shows an example of a positional relationship between a group of objects detected at the present time and a group of objects detected s sec before the present time, in accordance with the embodiment.

With reference to FIGS. 1 to 5, a driving assist device 1 in accordance with this embodiment will be described. FIG. 1 is a construction diagram of the driving assist device in accordance with this embodiment. FIG. 2 shows an example of a positional relationship among the driver, a sight field video picture camera and objects in accordance with the embodiment. FIG. 3 shows an example of a sight field image provided by the sight field video picture camera in the embodiment which is superimposed with eye marks. FIG. 4 shows an example of a positional relationship between a millimeter wave radar and objects. FIG. 5 shows an example of a positional relationship between a group of objects detected at the present time and a group of objects detected s sec before the present time, in accordance with the embodiment.

The driving assist device 1 estimates the driver's sight-line end, and detects an obstacle (a vehicle, a pedestrian, etc.) that can obstruct the running of the host vehicle. If such an obstacle exists, the driving assist device 1 performs a warning control in accordance with the driver's degree of awareness of the obstacle. In order to estimate the sight-line end, the driving assist device 1 detects an image object (image target object) existing on the driver's sight line vector on the basis of a sight field image from the sight field video picture camera, and detects a millimeter-wave object (millimeter wave target object) existing on the driver's sight line vector on the basis of millimeter wave information from the millimeter wave radar, and identifies the sight-line object (the target object at which the driver is directing his/her sight line) among all the detected objects. In particular, the driving assist device 1 detects an object existing on the driver's sight line vector by factoring in the relative positional information between the position of the driver (in particular, the position of the eyes) and the position of each detection means, in order to improve the accuracy in estimating the sight-line end. Therefore, the driving assist device 1 includes a driver-purpose camera 2, a LED (Light Emitting Diode) 3, a sight field video picture camera 4, a millimeter wave radar 5, a warning device 6, and an ECU (Electronic Control Unit) 7.

In the embodiment, it may be understood that the driver-purpose camera 2 and a process performed by the ECU 7 correspond to a sight-line direction detection portion in the invention, and that the sight field video picture camera 4, the millimeter wave radar 5 and a process performed by the ECU 7 correspond to a target object detection portion in the invention, and that the driver-purpose camera 2 and a process performed by the ECU 7 correspond to a relative position acquisition portion in the invention, and that a process performed by the ECU 7 corresponds to a sight-line end estimation portion and an evaluation portion.

The driver-purpose camera 2 is a stereo camera which acquires images of the face of a driver and its surroundings in order to detect the driver's sight line vector and the position of the eyes, and which is made up of two cameras. The driver-purpose camera 2 is mounted facing in a direction to the driver's face and its surrounding, and the two cameras making up the driver-purpose camera 2 are spaced from each other by a predetermined interval in a horizontal direction. Besides, the driver-purpose camera 2 is a near-infrared camera that captures near-infrared radiation (reflected near-infrared light from the LED 3, or the like), and generates near infrared video picture in accordance with the brightness of the near-infrared radiation. The near-infrared video picture is made up of near-infrared images of picture frames at constant time intervals (e.g., of ⅟30 second). The driver-purpose camera 2 sends stereo near-infrared image information of each frame as a driver's image signal to the ECU 7 at every constant time interval.

The LED 3 is an LED that emits near-infrared radiation. The LED 3 is mounted in an instrument panel so as to radiate to the driver's face and its surroundings. When the driving assist device 1 is activated, the LED 3 radiates near-infrared radiation to the driver's face and its surroundings. Thus, near-infrared radiation is radiated by the LED 3 to the driver's face and its surroundings, and images of the driver's face and its surroundings are taken by the near-infrared camera (driver-purpose camera 2). In this manner, images of only the driver's face and its surroundings are acquired. In addition, the near-infrared radiation is harmless to human beings, and does not interfere with the driver's operations.

The sight field video picture camera 4 is a monocular camera that acquires images corresponding to the driver's field of sight. The sight field video picture camera 4 is mounted in the middle of a front side of the host vehicle (e.g., on a reverse side (front side) of the rearview mirror), so as to face forward. The position at which the sight field video picture camera 4 is mounted is pre-stored in the ECU 7 as a position thereof relative to a predetermined position in the host vehicle (e.g., the position of the center of gravity of the host vehicle, or the center position of the front end of the host vehicle) that is defined as the origin. The sight field video picture camera 4 takes images forward of the host vehicle, and generates a sight field video picture. The sight field video picture is made up of sight field images of frames at constant time intervals. The sight field video picture camera 4 sends the sight field image information of each frame as a sight field image signal to the ECU 7 at every constant time. In addition, the sight field video picture camera 4 also acquires information regarding objects existing relatively far from the host vehicle.

The millimeter wave radar 5 detects millimeter-wave objects by using millimeter waves. The millimeter wave radar 5 is mounted in the middle of a front end of the host vehicle so as to face forward. The position at which the millimeter wave radar 5 is mounted is pre-stored in the ECU 7 as a position relative to a predetermined position in the host vehicle that is defined as the origin. The millimeter wave radar 5 sends out millimeter waves forward from the host vehicle while scanning the waves within a horizontal plane, and receives reflected millimeter waves. Then, the millimeter wave radar 5 sends send-out/reception data regarding the millimeter waves as a millimeter wave signal to the ECU 7. Incidentally, the millimeter wave radar 5 is able to acquire only information regarding objects existing near the host vehicle, compared with the sight field video picture camera 4.

The warning device 6 outputs warning sound upon receiving a warning signal from the ECU 7. The warning device 6 is able to change the intensity of the sound, the kind of sound (frequency) and the output timing in any desired manner, and is able to output various warning sounds in accordance with warning information that is contained in the warning signal.

The ECU 7 is made up of a CPU (Central Processing Unit), a ROM (Read-Only Memory), a RAM (Random Access Memory), etc., and performs general control of the driving assist device 1. When the driving assist device 1 is activated, the ECU 7 loads a dedicated application program stored in the ROM onto the RAM, and executes the program through the use of the CPU. Thus, the ECU 7 constitutes the sight-line end estimation portion, an obstacle detection portion, and a warning control portion. At every constant time based on the master clock of the CPU, the ECU 7 takes in a driver's image signal from the driver-purpose camera 2, the sight field image signal from the sight field video picture camera 4, and the millimeter wave signal from the millimeter wave radar 5. Then, the ECU 7 performs process in various portions on the basis of the information contained in these signals at every constant time, and sends the warning signal to the warning device 6 if necessary.

A process performed in the sight-line end estimation portion will be described. The sight-line end estimation portion detects image objects and millimeter-wave objects, and identifies one sight-line object from all the detected objects. To that end, the sight-line end estimation portion performs a driver's information detection process, an object recognition-scan process, a radar hybrid process, and a time-space matching process.

The driver's information detection process will be described. In the driver's information detection process, the driver's sight line vector (corresponding to the sight-line direction) and the position of the eyes are detected from a driver's image (stereo image) generated from the driver's image signal. Firstly, the ECU 7 extracts from the driver's image an image of a portion that includes the driver's eyes, by the pattern matching with a template of the eyes, or the like. Then, the ECU 7 detects a sight line vector from the eye portion image. The sight line vector is detected through the use of a common sight-line detection technology. The sight line vector V is represented by a driver's sight-line direction α with respect to the longitudinal direction W of the vehicle, with reference to the position of an eye of the driver, as shown in FIG. 2. Besides, the ECU 7 finds a relative distance and a relative direction of the eye position with respect to the driver-purpose camera 2 in a manner of triangulation, through the use of a difference in how an object in the extracted eye portion looks between the left and right stereo images, and detects the eye position from the relative distance, the relative direction and the position of the driver-purpose camera 2. This eye position and the position of the driver-purpose camera 2 are the positions thereof relative to a predetermined position in the host vehicle which is defined as the origin.

The object recognition-scan process will be described. In the object recognition-scan process, the relative positional information between the driver's eye position and the position of the sight field video picture camera 4 is taken into account, and the objects existing on the driver's sight line vector are extracted as image objects, from the objects detected from the sight field image.

Firstly, the ECU 7 calculates a relative distance and a relative direction between the driver's eye position and the position of the sight field video picture camera 4. The position of the sight field video picture camera 4 is pre-stored in the ECU 7 as mentioned above, and the pre-stored value is used for the calculation. Then, the ECU 7 sequentially sets focal distances P1, P2, . . . on the sight line vector V in that order from a position near the driver D to an arbitrary position, as shown in FIG. 2. The arbitrary position may be set as appropriate, and is set, factoring in the detectable distance in the direction of depth in the sight field image. The focal distances are depth components on the driver's sight line. The intervals or differences between the focal distances may be set as appropriate; for example, the intervals may be set at a constant distance, or may also be increased with the increasing distance in the depth direction. At this time point, the actual driver's focal distance has not been known (i.e., it is not known which one of the objects on the sight line vector the driver is actually looking at). Therefore, the focal distances P1, P2 . . . are provisional focal distances.

Furthermore, as shown in FIG. 3, the ECU 7 sets eye marks E1, E2, . . . that correspond to the positions of the focal distances P1, P2, . . . on the sight line vector V in the sight field image. At this time, the ECU 7 converts the focal distances P1, P2, . . . on the sight line vector V into the positions in the sight field image on the basis of the relative distance and the relative direction between the driver's eye position and the position of the sight field video picture camera 4. The eye marks E1, E2, . . . are positions in the sight field image that correspond to the positions of the focal distances P1, P2, . . . on the driver's sight line vector V in the case where it is assumed that the driver's eye is at the position of the sight field video picture camera 4. Then, the ECU 7 performs object recognition within a range of a radius of r pixels from each of the eye marks E1, E2, . . . in the sight field image. The radius of r pixels is set taking the intervals between the eye marks into account. The object recognition is performed through the use of a common object recognition technique. For example, templates of objects expected to exist on roads are prepared, and the templates are used for pattern matching in order to recognize an object. If an object is recognized, the ECU 7 determines the object as an image object, and retains the position (x, y) of the image object in the sight field image and, furthermore, the focal distance that corresponds to the eye mark as information regarding the image object. In the example shown in FIG. 3, the ECU 7 recognizes an object Oa at the eye mark E3, and retains the focal distance P3 as information regarding the image object, and also recognizes an object Ob at the eye mark E5, and retains the focal distance P5 as information regarding the image object.

Since this object recognition-scan process uses a sight field image, objects existing relatively far from the host vehicle can also be detected. Besides, the object recognition-scan process is a technique that is excellent in detection of objects, such as traffic signs and the like (representing a stop, no entry, a vehicle speed limit, etc), traffic signals (including color information as well), a halt line, etc.

For the object detection through the use of the sight field image, methods other than the aforementioned method may also be employed. For example, the object recognition is performed with respect to the entire sight field image, and all the objects existing in the sight field image are extracted. Then, eye marks are set in the sight field image as in the above-described method. Furthermore, the positions of the objects and the positions of the eye marks in the sight field image are compared so as to extract the objects each of which exists within a range of the radius of r pixels from an eye mark, as image objects.

The radar hybrid process will be described. In the radar hybrid process, relative positional information between the driver's eye position and the position of the millimeter wave radar 5 is taken into account, and the objects existing on the driver's sight line vector are extracted as millimeter-wave objects, from the objects detected from the millimeter wave information.

Firstly, the ECU 7 calculates a relative distance and a relative direction between the driver's eye position and the position of the millimeter wave radar 5. The position of the millimeter wave radar 5 is pre-stored in the ECU 7 as mentioned above, and the pre-stored value is used for the calculation. Then, as shown in FIG. 4, the ECU 7 converts the sight line vector V of the driver D into a vector (sight line vector V') in a coordinate system of the millimeter wave radar 5, on the basis of the relative distance and the relative direction between the driver's eye position and the position of the millimeter wave radar 5. The sight line vector V' is a sight line vector on an assumption that the driver's eye is at the position of the millimeter wave radar 5. As shown in FIG. 4, the sight line vector V' is expressed in a driver's sight-line direction θ with respect to the longitudinal direction W of the vehicle, with reference to the position of the millimeter wave radar 5.

Furthermore, the ECU 7 detects an object existing on the sight line vector V' on the basis of the millimeter wave information. At this time, if a reflected millimeter wave of the millimeter waves sent out in the direction of the sight line vector V' is received, it means that an object is detected. If an object is detected, the ECU 7 determines the object as a millimeter-wave object, and calculates the distance to the object (focal distance) as information regarding the millimeter-wave object. The focal distance herein is a distance obtained by calculating the distance from the millimeter wave radar 5 to the object on the basis of the time from the emission to the reception of a millimeter wave, and by converting the calculated distance from the millimeter wave radar 5 to the object into a distance from the driver's eye position to the object on the basis of the relative distance and the relative direction between the driver's eye position and the millimeter wave radar 5. In the example shown in FIG. 4, an object Oa on the sight line vector V' is detected, and the focal distance is calculated as information regarding the millimeter-wave object. Although an object Ob also exists on the sight line vector V', the object Ob is not detected since it lies behind the object Oa. An object Oc is not detected, since it is not on the sight line vector V'.

Since the radar hybrid process uses millimeter wave information, objects existing relatively near from the host vehicle are detected. Besides, the radar hybrid process is a technique that is excellent in the detection of objects, such as other vehicle, pedestrians, etc.

Incidentally, for the object detection through the use of the millimeter wave information, methods other than the above-described method may also be employed. For example, using millimeter wave information, the object detection is performed with respect to the entire region in which the detection based on millimeter waves is possible, and all the objects existing in the entire detection-possible region are extracted, and the distances and directions of the objects are calculated. Then, as in the foregoing method, the sight line vector V is converted into a sight line vector V' on the basis of the relative positional information. Furthermore, the sight line vector V' and the directions of the objects are compared in order to extract objects whose directions are the same as that of the sight line vector V', as millimeter-wave objects. Alternatively, on the basis of the relative positional information, the directions and the distances of the extracted objects are converted into the directions and the distances thereof in a coordinate system of the driver's eye (that is, the directions and the distances thereof on an assumption that the millimeter wave radar 5 is at the position of the driver's eye). Furthermore, the sight line vector V and the converted directions of the objects are compared in order to extract objects whose directions are the same as that of the sight line vector V, as millimeter-wave objects.

The time-space matching process will be described. In the time-space matching process, the object at which the driver is actually directing his/her sight line (sight-line object) is identified among all the detected image objects and all the detected millimeter-wave objects. The time-space matching process includes a first method and a second method, either one of which is used to identify the sight-line object. In either one of the methods, utilizing the fact that since the host vehicle is moving, the positional relationship between the host vehicle (driver) and the objects is changing and the driver's sight line vector is also changing, the sight-line object is identified by comparing a group of objects detected at the present time and a group of objects detected before the present time.

The first method will be described. Firstly, if the number of objects (image objects or millimeter-wave objects) detected at the present time is one, the ECU 7 fixes the object as the sight-line object. If a plurality of objects are detected at the present time, the ECU 7 determines whether or not the vehicle is at rest. If the vehicle is at rest, the ECU 7 fixes the object whose focal distance is the shortest (i.e., which is the nearest from the driver) in the group of objects detected at the present time, as the sight-line object. Since it is safe (the possibility of collision with an obstacle is safe) during a stop of the vehicle, the nearest object is selected as the sight-line object. In addition, as for the determination as to whether the vehicle is at rest or the like, there is no particular limitation; for example, the vehicle speed detected by the vehicle speed sensor is used for the determination.

If the vehicle is running, the ECU 7 compares the group of objects detected at the present time and the group of objects detected s sec before the present time, and detects an object that is common to the two groups. The s sec may be set as appropriate, and may be a fixed value, for example, 0.1 second, 0.2 second, etc., or may also be a variable value in accordance with the vehicle speed. In the example shown in FIG. 5, two objects which are an object Oa and an object Od are detected at the present time t whereas, s sec before the present time, two objects which were the object Oa and the object Ob were detected. Therefore, the object Oa is detected as a common object. Then, if there is only one common object, the ECU 7 fixes the common object as the sight-line object. If there are a plurality of common objects, the ECU 7 goes back to the objects detected another s sec before (i.e., 2×s sec before the present time). Specifically, the ECU 7 compares the group of objects detected at the present time, the group of objects detected s sec before the present time, and the group of objects detected 2×s sec before the present time, and then detects an object or objects that are common among all the groups. After that the ECU 7 determines whether or not the number of the common objects is one.

The ECU 7 goes back in time with intervals of s sec to fetch the group of objects detected sequentially earlier by s second and add it for the comparison, and performs the above-described process repeatedly until the number of common objects becomes one. Then, if there still exist a plurality of common objects despite the addition of the group of objects detected n×s sec before the present time, the ECU 7 does not go back any further in time, and does not fix a sight-line object. In such a case, the ECU 7 determines that the driver's sight line is moving (i.e., a following movement, a saccadic eye movement), and cannot identify the sight-line end, and therefore does not fix a sight-line object. The time of n×s sec is set so as to be sufficient to determine whether the driver's sight line is moving. In addition, in this case, the previously fixed sight-line object may be used as the present-time sight-line object, or the object whose focal distance is the shortest of the objects detected at the present time may be used as the sight-line object.

The second method will be described. In the second method, in the case where there is only one object and in the case where the vehicle is at rest, the sight-line object is fixed as in the first method. In the case where the vehicle is running, the ECU 7 calculates a point of intersection between the driver's sight line vector detected at the present time and the driver's sight line vector detected s sec before the present time. The point of intersection is calculated by using the position of the driver's eye at the present time (the initial point of the present-time sight line vector) as a reference, and calculating a movement distance during s sec from the vehicle speed, and determining a sight line vector initial point occurring s sec before the present time, and extending sight line vectors from the initial points. Then, the ECU 7 fixes, as the sight-line object, the object that is the nearest to the point of intersection in the group of objects detected at the present time. In the example shown in FIG. 5, two objects which are an object Oa and an object Od are detected at the present time t, and the intersecting point between the sight line vector $V_t$ of the present time t and the sight line vector $V_{1-s}$ of s sec before the present time is a point represented by I, and the object Oa that is the nearest to the intersecting point I is detected as the sight-line object. If an intersecting point does not occur, the ECU 7 determines that the driver's sight line is moving as in the first method, and does not fix the sight-line object. In this case, the previously fixed sight-line object or the object whose focal distance is the shortest may be determined as the sight-line object.

Incidentally, the driver's sight-line end is provided by the driver's sight line vector and the focal distance that is associated in correspondence with the identified eye point object (object), which means that the driver is looking at the point of the focal distance on the sight line vector.

A process performed in the obstacle detection portion will be described. The ECU 7, factoring in the traveling direction of the host vehicle, searches for an obstacle (another vehicle, a pedestrian, etc.) that can obstruct the travel of the host vehicle on the basis of information from various detection means. Then, if the ECU 7 detects an obstacle, the ECU 7 acquires information regarding the position of the obstacle. In addition, the detection method for an obstacle is not particularly limited, and may be other methods, such as a method that uses sight field images provided by a monocular camera, a method that uses millimeter wave information, a method that uses stereo images provided by a stereo camera.

A process performed in the warning control portion will be described. The ECU 7 determines whether or not the sight-line object identified by the sight-line end estimation portion and the obstacle detected by the obstacle detection portion coincide with each other, or determines the degree of coincidence therebetween. Then, if they do not coincide or the degree of coincidence therebetween is not high, the ECU 7 generates warning information, and sends out a warning signal indicating the warning information to the warning device 6. In the case where the determination is performed merely as to whether the identified sight-line object and the detected obstacle coincide with each other, the warning information is merely warning sound ON/OFF information. In the case where the degree of coincidence therebetween is determined, the warning information is information for causing the production of a warning sound that causes the driver to pay attention more greatly (e.g., information that strengthen the sound, information that shortens the output intervals of sound) the lower the degree of coincidence is.

With reference to FIG. 1, an operation of the driving assist device 1 will be described. In particular, the object recognition-scan process performed by the ECU 7 will be described following the flowchart of FIG. 6, and the radar hybrid process will be described following the flowchart of FIG. 7. The first method of the time-space matching process will be described with the flowchart of FIG. 8. The second method of the time-space matching process will be described with the flowchart of FIG. 9.

When the driving assist device 1 is activated, the LED 3 radiates near-infrared radiation toward the driver's face and its surroundings. The driver-purpose camera 2 receives near-infrared radiation reflected therefrom, and takes near-infrared images (stereo images), and sends the obtained near-infrared radiation images as a driver's image signal to the ECU 7. The sight field video picture camera 4 takes pictures forward of the vehicle, and sends the obtained sight field images as sight field image signals to the ECU 7. The millimeter wave radar 5 sends millimeter waves forward, and receives reflected millimeter waves, and sends the send-out/reception data as a millimeter wave signal to the ECU 7.

The ECU 7 receives a driver's image signal from the driver-purpose camera 2, a sight field image signal from the sight field video picture camera 4, and a millimeter wave signal from the millimeter wave radar 5, at every constant time. Then, on the basis of the driver's image signal, the ECU 7 detects the driver's sight line vector and the position of the driver's eye (S10 in FIG. 6, S20 in FIG. 7).

Figure 6:
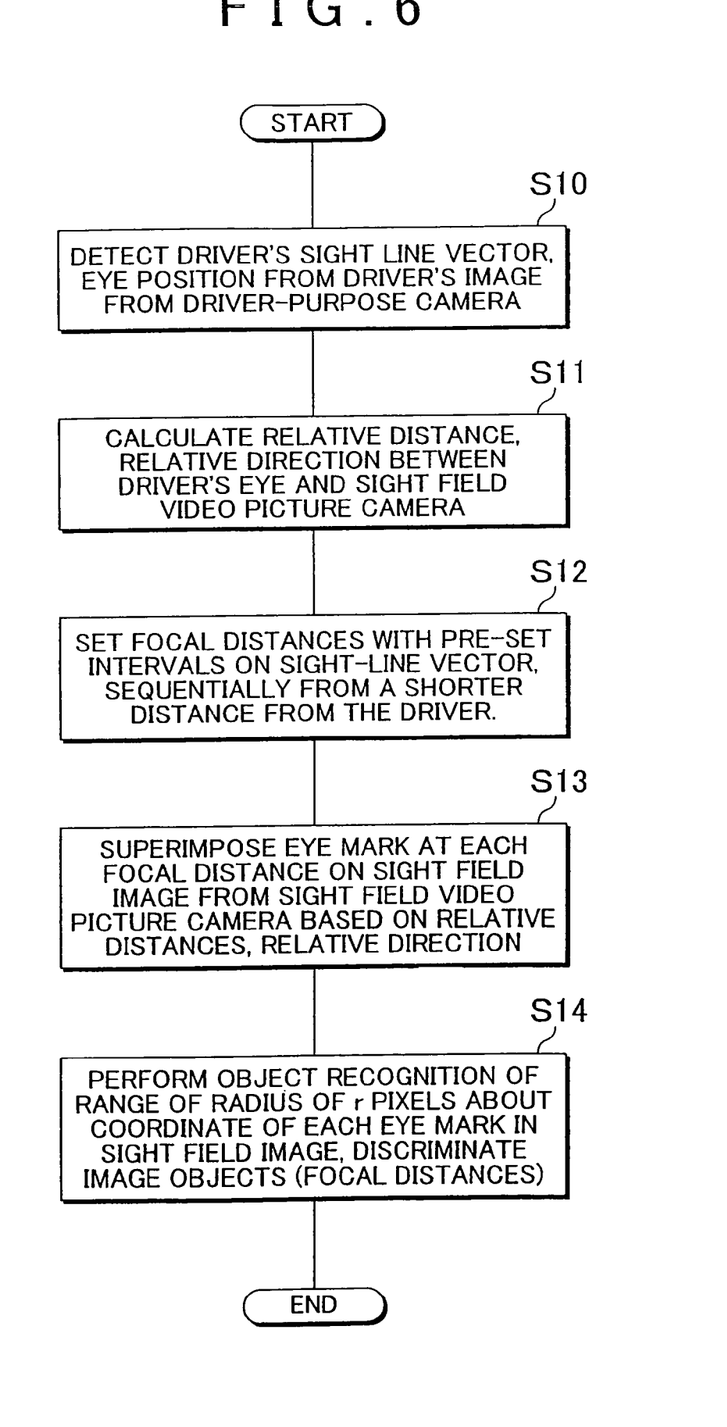
FIG. 6 is a flowchart showing an object recognition-scan process performed by an ECU in accordance with the embodiment.

The ECU 7 calculates the relative distance and the relative direction between the driver's eye and the sight field video picture camera 4 (S11 in FIG. 6). Then, the ECU 7 sets focal distances at predetermined intervals sequentially from a short-distance location from the driver to an arbitrary distance (S12 in FIG. 6) on the sight line vector. Furthermore, the ECU 7 superimposes eye marks at each of the focal distances set on the sight line vector in the sight field image on the basis of the calculated relative distance and the calculated relative direction (S13 in FIG. 6). Then, the ECU 7 performs object recognition in a range of the radius of r pixels about the coordinate of each of the eye marks in the sight field image, and if an object is recognized, the ECU 7 determines it as an image object (S14 in FIG. 6). Herein, the image object existing on the driver's sight line vector is detected from the sight field image, factoring in the relative positional relationship between the driver's eye and the sight field video picture camera 4. This image object is associated in correspondence with a focal distance on the sight line vector.

Figure 7:
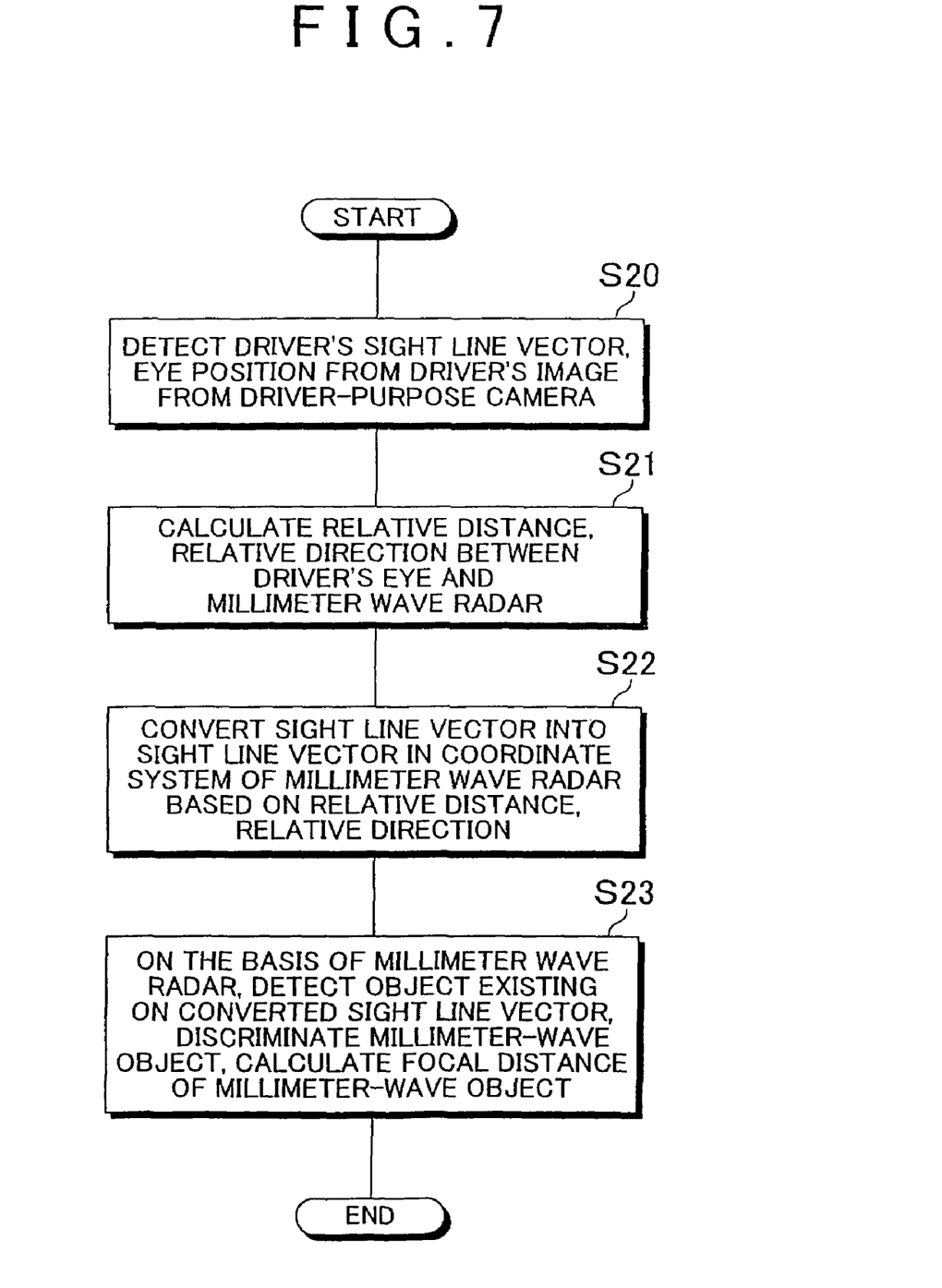
FIG. 7 is a flowchart showing a radar hybrid process performed by the ECU in accordance with the embodiment.

ECU 7 calculates the relative distance and the relative direction between the driver's eye and the millimeter wave radar 5 (S21 in FIG. 7). Then, on the basis of the relative distance and the relative direction calculated, the ECU 7 converts the driver's sight line vector into a sight line vector in the coordinate system of the millimeter wave radar (S22 in FIG. 7). Furthermore, on the basis of the millimeter wave information (signal), the ECU 7 searches for an object existing on the converted sight line vector, and if an object is detected, the ECU 7 determines it as a millimeter-wave object, and calculates the focal distance of the millimeter-wave object (S23 in FIG. 7). Herein, the millimeter-wave object existing on the driver's sight line vector is detected from the millimeter wave information, factoring in the relative positional relationship between the driver's eye and the millimeter wave radar 5.

The ECU 7 associates the driver's sight line vectors and group of detected objects (the detected image objects and the detected millimeter-wave objects) with detection time points associated in correspondence, and thus stores them in predetermined storage areas.

Figure 8:
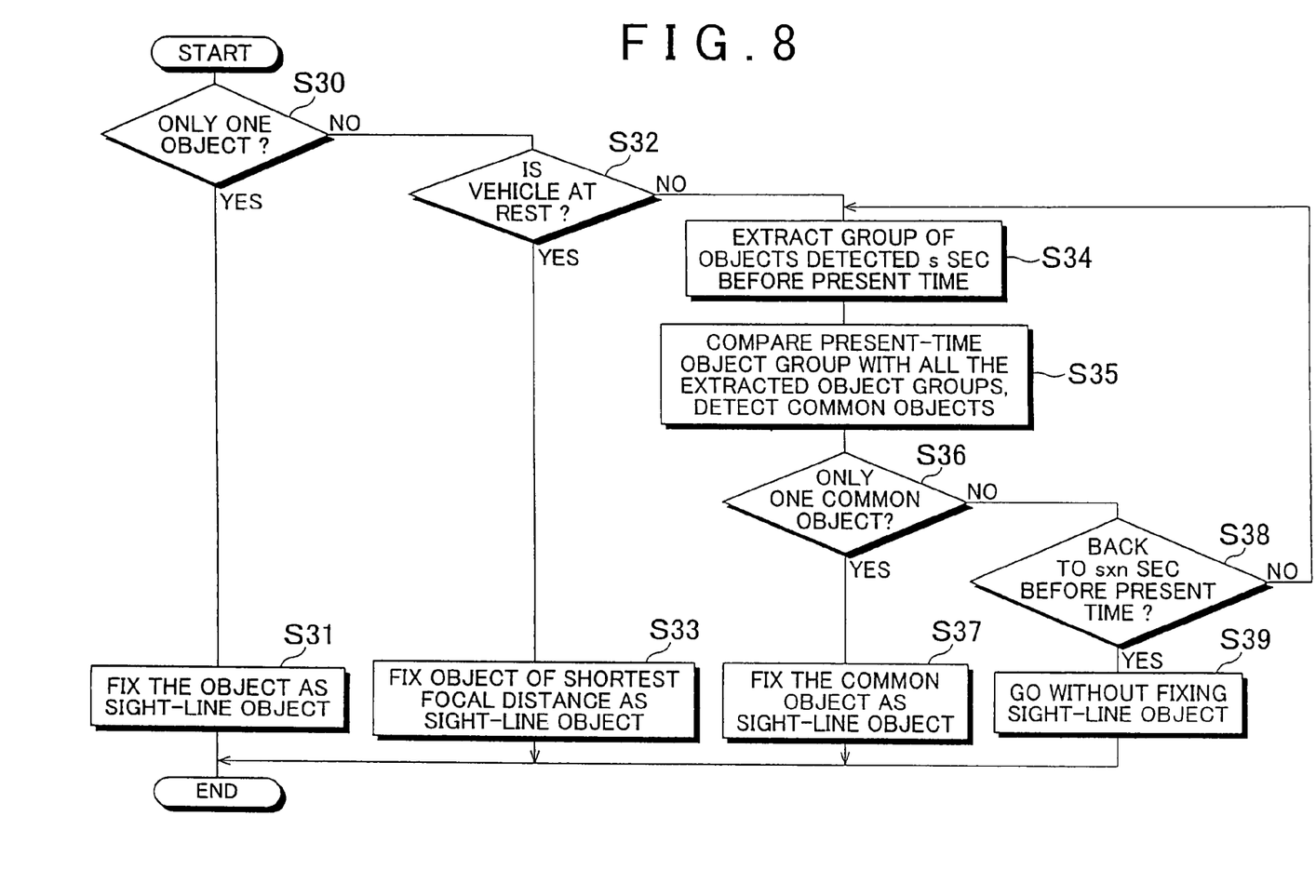
FIG. 8 is a flowchart showing a time-space matching process (first method) performed by the ECU in accordance with the embodiment.
Figure 9:
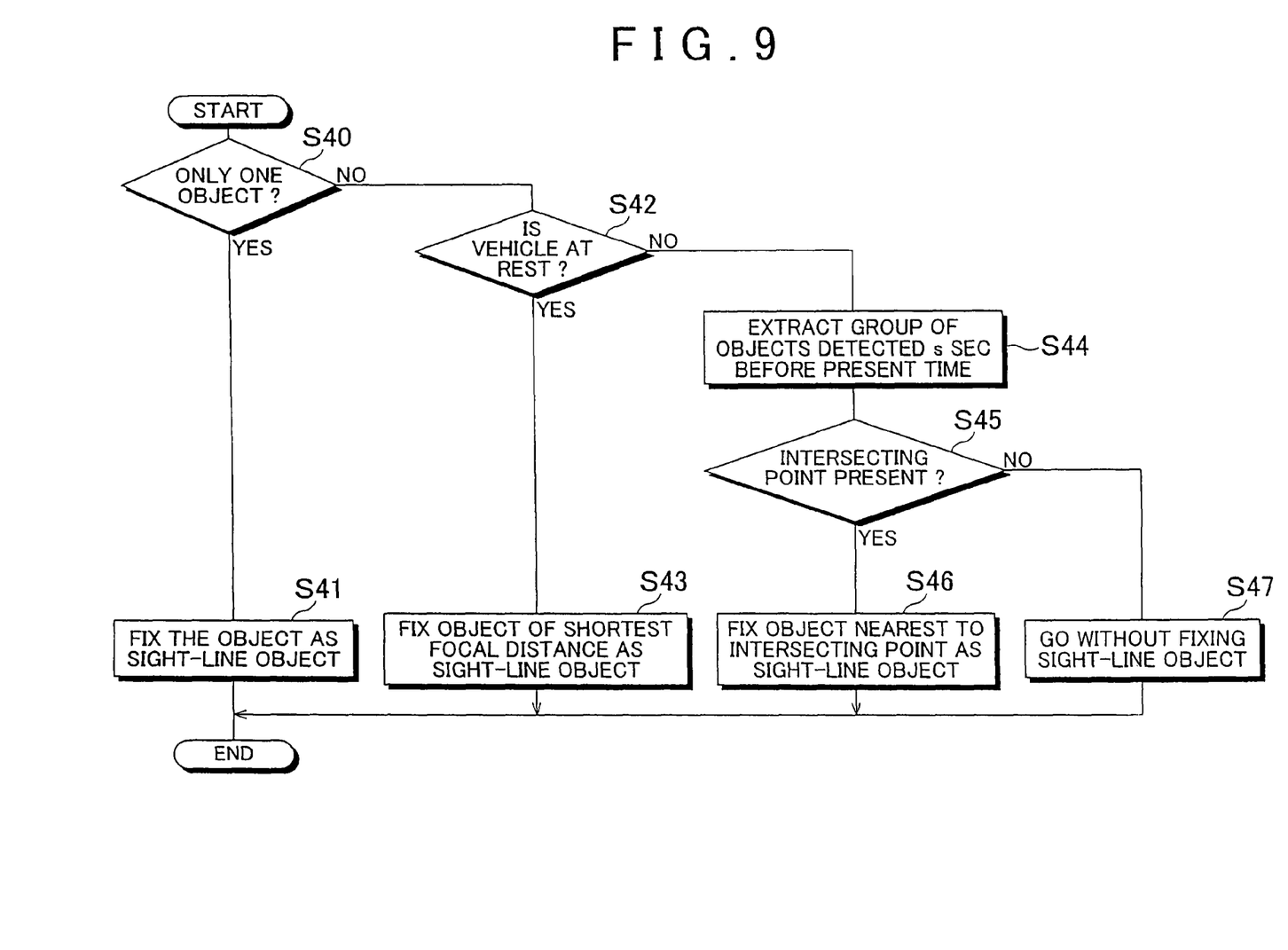
FIG. 9 is a flowchart showing a time-space matching process (second method) performed by the ECU in accordance with the embodiment.

In the case of the first method of the time-space matching process, the ECU 7 determines whether or not the number of the detected objects is one (S30 in FIG. 8). If in S30 it is determined that the number is one, the ECU 7 fixes the object as the sight-line object (S31 in FIG. 8). If in S30 it is determined that the number of the detected objects is plural, the ECU 7 determines whether or not the vehicle is at rest (S32 in FIG. 8). If in S32 it is determined that the vehicle is at rest, the ECU 7 fixes the object whose focal distance is the shortest of all the detected objects as the sight-line object (S33 in FIG. 8).

If in S32 it is determined that the vehicle is running, the ECU 7 extracts the group of objects detected s sec before the present time (S34 in FIG. 8). Then, the ECU 7 compares the group detected at the present time and the extracted group to detect objects common between the presently detected group and the extracted group (S35 in FIG. 8). Next, the ECU 7 determines whether or not the number of the common objects is one (S36 in FIG. 8). If in S36 it is determined that the number of the common objects is one, the ECU 7 fixes the common object as the sight-line object (S37 in FIG. 8).

If in S36 it is determined that the number of the common objects is plural, the ECU 7 determines whether or not the ECU 7 has gone back to the time of s×n sec before the present time (S38 in FIG. 8). If in S38 it is determined that the ECU 7 has gone back to the time of s×n sec before the present time, the ECU 7 does not fix a sight-line object (S39 in FIG. 8). If in S38 it is determined that the ECU 7 has not gone back to the time of s×n sec before the present time, the ECU 7 goes back to the process of S34, in which the ECU 7 extracts the group of objects detected another s sec earlier, and adds the extracted group of objects for the comparison with the presently detected group of objects in order to detect objects common among the presently detected group and the extracted groups. The ECU 7 repeatedly performs this process until the number of common objects becomes one or until the ECU 7 has gone back to the time of s×n sec.

In the case of the second method of the time-space matching process, the ECU 7 performs, in S40 to S43 in FIG. 3, a process similar to that in the first method (S30 to S33 in FIG. 8). If in S42 it is determined that the vehicle is running, the ECU 7 calculates an intersecting point between the sight line vector at the present time and the sight line vector occurring s sec before the present time (S44 in FIG. 9). Next, the ECU 7 determines whether or not there is an intersecting point (S45 in FIG. 9). If in S45 it is determined that there is an intersecting point, the ECU 7 fixes the object that is the nearest to the intersecting point in the group of present-time objects, as the sight-line object (S46 in FIG. 9). If in S45 it is determined that there is no intersecting point, the ECU 7 does not fix a sight-line object (S47 in FIG. 9).

Through the process described above, only one sight-line object at which the driver is directing his/her sight line is fixed, and the driver's sight line vector and the focal distance on the sight line vector (the sight-line end) become known.

Furthermore, the ECU 7 searches for an obstacle that can obstruct the traveling of the host vehicle, and, if an obstacle is detected, the ECU 7 acquires information regarding the position of the obstacle.

The ECU 7 determines whether the fixed sight-line object and the detected obstacle coincide with each other, or determines the degree of coincidence therebetween. Then, if they do not coincide or the degree of coincidence therebetween is not high, the ECU 7 generates warning information, and sends a warning signal that contains the warning information to the warning device 6. In addition, if an obstacle has been detected while the sight-line object cannot be fixed, the ECU send a warning signal that contains prescribed warning information to the warning device 6. If no obstacle is detected, no warning signal is sent since no obstacle exists.

Upon receiving the warning signal, the warning device 6 outputs a warning sound in accordance with the warning information contained in the warning signal. Due to the warning sound, the driver realizes that there is an obstacle other than the sight-line end, and directs his/her sight line to that obstacle as well.

According to this driving assist device 1, the driver's sight-line end is estimated factoring in the relative positional relationship between the position of the driver and the position of each detection means for the object. Therefore, the estimation of the sight-line end can be accomplished with the driver's eye point and the detection reference point of the various detection means being brought into coincidence. Therefore, the accuracy in the sight-line end estimation improves. In particular, the driving assist device 1 estimates the driver's sight-line end as the sight line vector in the case where the driver's eye point is brought into coincidence with the detection reference point of the detection means (in the case where the position of the driver's eye and the position of the detection means are brought into coincidence) by adjusting the driver's sight line vector through the use of the relative positional relationship between the driver's eye and the various detection means for detecting objects.

The driving assist device 1 detects objects by two methods, that is, the object recognition-scan process using image information, and the radar hybrid process using millimeter wave information, so that objects that correspond well with the characteristic of either method are detected with high accuracy, that is, various kinds of objects are detected with high accuracy. Besides, even in the case where a plurality of objects are detected, the driving assist device 1 identifies one sight-line object easily with high accuracy by comparing groups of objects detected at different time points through a time-space matching process.

In conjunction with the embodiment, the driving assist device that outputs warning on the basis of a positional relationship between the driver's sight-line end and an obstacle has been described. However, the sight-line end estimation device of the invention can be applied to various devices. For example, the sight-line end estimation device of the invention may be used as a device that performs only the estimation of the driver's sight-line end, or may also be applied to a driving assist device that warns a driver by other means, such as sound/voice, images, etc., or may also be applied to a driving assist device that performs the vehicle control, such as a brake control, a vehicle speed control, etc., from a relationship between the driver's sight-line end and an obstacle.

Furthermore, in the embodiment, the sight-line end is estimated by identifying a sight-line object, it is also permissible to find a region or the like at which the driver is directing his/her sight line instead of identifying the object at which the driver is directing his/her sight line.

In the embodiment, image objects are detected on the basis of images from the sight field video picture camera, and millimeter-wave objects are detected on the basis of the millimeter wave information from the millimeter wave radar, and the sight-line object is identified from all the detected objects. However, objects may be detected by using only images or only millimeter wave information, or may also be detected by using other information. Although in the foregoing embodiment, the sight field video picture camera and the millimeter wave radar are used as detection means for objects, any other detection means may also be used as long as the means is of a type that includes an autonomous sensor; for example, a stereo camera, a laser radar, or an ultrasonic radar may be used.

Although in the embodiment, the driver's sight-line object is identified by either one of the two methods of the time-space matching process, the sight-line object may also be identified by another method. For example, the object existing at the shortest distance of the detected objects may be identified as the sight-line object, or the most outstanding object or the most dangerous object may be identified as the sight-line object.

Furthermore, in the foregoing embodiment, the position of the driver's eye is detected from a stereo image provided by the driver-purpose camera, and relative positional information is calculated from the position of the driver's eye and the preset position of the sight field video picture camera or the preset position of the millimeter wave radar. However, other methods may also be used to acquire relative positional information. For example, the relative positional information may be directly obtained; for instance, an image that includes the driver and various detection means is taken through the use of a camera, and relative positional information between the driver and the detection means is obtained from the image. Furthermore, since the position of the driver's head (therefore, the position of the driver's eye) can be approximately estimated, relative positional information between an average driver's head position (eye position) and the position of the detection means is found beforehand, and the relative positional information is pre-stored in storage means, and the relative positional information is acquired, when necessary, by reading it from the storage means.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A sight-line end estimation device comprising:
    a sight-line direction detection portion that detects a sight-line direction of a driver of a vehicle;
    a target object detection portion that detects a position of a target object existing around the vehicle;
    a relative position acquisition portion that acquires relative positional information between the driver and the target object detection portion; and
    a sight-line end estimation portion that estimates a sight-line end of the driver by detecting a target object whose position detected by the target object detection portion lies substantially in the driver's sight-line direction detected by the sight-line direction detection portion, factoring in the relative positional information acquired by the relative position acquisition portion, and
    an evaluation portion that evaluates a likelihood of the driver's sight line being presently directed in a direction of the target object, wherein
    the sight-line end estimation portion estimates the driver's sight-line end based on the target object at which it is highly likely that the driver's sight line is presently directed, using a result of evaluation provided by the evaluation portion,
    the evaluation portion evaluates the likelihood of the driver's sight line being presently directed in the direction of the target object based on the target object whose position lies substantially in the driver's sight-line direction detected concurrently with the position of the target object, at a plurality of time points, and the evaluation portion determines that, of target objects whose positions lie substantially in the driver's sight-line direction acquired concurrently with the positions of the target objects at any one of the plurality of time points, a common target object that is common to the plurality of time points is the target object at which it is highly likely that the driver's sight line is presently directed.

2. The sight-line end estimation device according to claim 1, wherein the sight-line end estimation portion corrects at least one of the driver's sight-line direction and the position of the target object based on the relative positional information so that the position of the driver and the position of the target object detection portion coincide with each other, and then detects the target object whose position lies substantially in the driver's sight-line direction.

3. The sight-line end estimation device according to claim 1, wherein the relative position acquisition portion acquires relative positional information between the driver's eye and the target object detection portion.

4. The sight-line end estimation device according to claim 1, wherein the sight-line direction detection portion detects the driver's sight-line direction at each of the plurality of time points, and the evaluation portion determines an intersecting point of the driver's sight-line directions detected at the plurality of time points, and determines the target object at which it is highly likely that the driver's sight line is presently directed based on a distance between the intersecting point and the target object.

5. The sight-line end estimation device according to claim 1, wherein the target object detection portion includes a sight field video picture camera that acquires an image of a sight field of the driver, and a millimeter wave radar that emits a millimeter wave and receives a reflected wave of the millimeter wave emitted, and the target object detection portion detects the target object based on the image acquired by the sight field video picture camera and the reflected wave received by the millimeter wave radar.

6. A driving assist device mounted in a vehicle, comprising:
the sight-line end estimation device according to claim 1; and
a warning portion that detects an obstacle that is likely to obstruct travel of the vehicle, and outputs a warning if the detected obstacle does not coincide with the target object existing at the sight-line end estimated by the sight-line end estimation device.

7. The sight-line end estimation device according to claim 1, wherein the target object detection portion includes a sight field video picture camera that acquires an image of a sight field of the driver, and
the relative position acquisition portion acquires the relative positional information between the driver and the sight field video picture camera.

\* \* \* \* \*